UNITED STATES PATENT OFFICE.

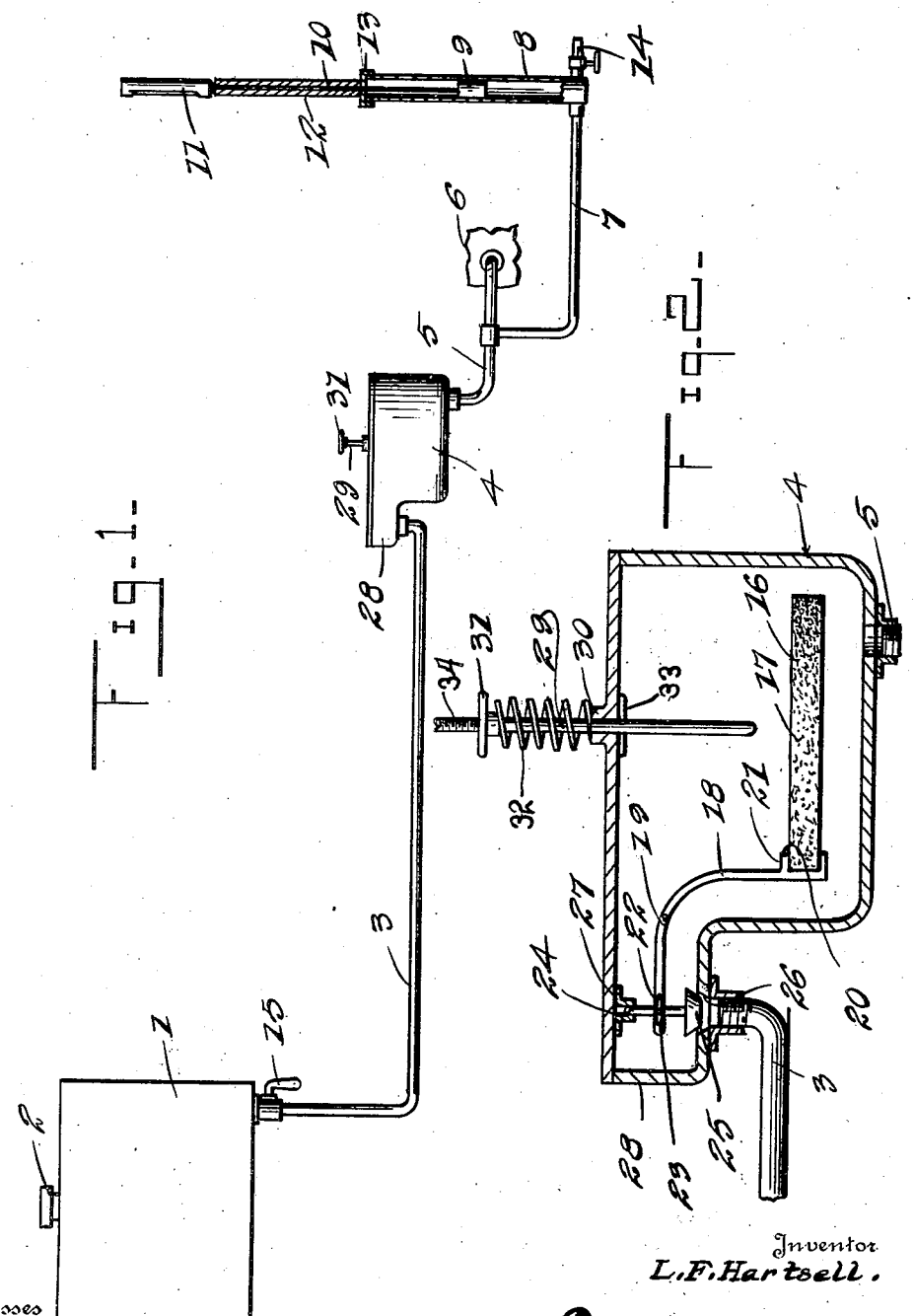

LYNDON F. HARTSELL, OF CAMERON, NORTH CAROLINA.

AUTOMATIC OILER.

1,186,186.　　　　Specification of Letters Patent.　　Patented June 6, 1916.

Application filed June 15, 1914. Serial No. 845,210.

*To all whom it may concern:*

Be it known that I, LYNDON F. HARTSELL, a citizen of the United States, residing at Cameron, in the county of Moore and State of North Carolina, have invented certain new and useful Improvements in Automatic Oilers, of which the following is a specification.

My invention relates to new and useful improvements in lubricating devices and has for its primary object to provide a novel and effective lubricating means that may be readily and easily attached to various makes of automobiles, motorcycles, and internal combustion or other engines and will operate in an extremely reliable and expeditious manner to provide a steady supply of oil to the engine so that efficient lubrication is provided and undue waste eliminated.

Another object is to provide novel means whereby the supply of oil from the reservoir to the engine is automatically cut off when a predetermined amount of oil is contained within a chamber which allows oil to run therefrom to the engine.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts, Figure 1 is a diagrammatic view of my improved oiler, and Fig. 2 is an enlarged detail sectional view taken through the automatic float valve forming a part of my invention.

Referring to the drawings by characters of reference, the numeral 1 designates as an entirety an oil tank or reservoir that is of any desired shape and provided with a removable cap 2 which seals an opening in the top of the tank through the medium of which the tank may be filled.

A pipe 3 is connected at one end with the lower or bottom wall of the tank 1 and at its other end with one end of a float chamber designated 4 as an entirety. The tank 1 is arranged above the float chamber. Thus the pipe 3 extends downwardly in a vertical plane for a portion of its length, then forwardly in a horizontal plane to the float chamber 4. From the float chamber 4 in which the automatic valve to be later more fully described is arranged, a pipe 5 leads, said pipe connecting the float chamber with the cylinder 6 of an engine. The float chamber 4 is arranged above the point where the pipe 5 connects with the crank case 6 at a point adjacent the bottom side thereof, thus the pipe 5 is formed similarly to the one 3. A pipe 7 is connected intermediate the ends of the pipe 5 and thereto at one end and at its other end is connected with the lower end of a vertical and cylindrical float chamber 8. A float 9 is mounted within the chamber 8 and has connected thereto an upstanding relatively thin wire or rod 10 which is connected with a suitable gage 11 that is to be attached to the dash board of the vehicle, not shown, preferably or arranged where it may be readily seen by the operator of the engine. A cylindrical pipe or casing 12 houses the wire or rod 10. This pipe or housing 12 is connected at its ends with a flanged cap 13 that is threaded upon the upper end of the chamber 8 and with the lower side of the gage 11. A drain cock 14 is operatively connected with the lower end of the float chamber 8. The gage 11 serves to indicate the amount of oil within the crank case that is the depth of oil and is preferably of the glass, dial and needle type. A cut off valve or cock 15 is arranged at the extreme upper end of the pipe 3 to cut off the flow of oil from the tank 1.

Mounted within the float chamber 4 is a float valve designated 16 as an entirety that includes a disk like float 17 to one side of which is secured a bell crank 18. The bell crank 18 is pivoted intermediate its ends as at 19 within the chamber 4 and provided at its lower end with spaced laterally extending flanges 20, which are arranged to engage upon opposite sides the faces of the float 17 and have a bolt or other suitable fastening pin 21 inserted therethrough and the float. A longitudinal slot 22 is formed adjacent to the other end of the bell crank 18 and receives a transverse pin 23 that is arranged intermediate the ends of and secured to a stem 24 and a frusto conical valve 25, which valve engages in a seat 26 of a frusto conical shape that is formed in the chamber 4 at a point where the lower end of the pipe 3 communicates therewith. A guide sleeve or bracket 27 is mounted upon the inner face of the upper wall of the float chamber 4 and slidably receives the upper end of the valve stem 24.

It will thus be seen that I have provided a pin and slot connection for the bell crank and valve stem which will allow free movement of the crank and valve. The chamber 4 may be rectangular or circular in formation but in either instance it is provided with an offset extension portion 28 adjacent to its upper end and to one side thereof. In this offset portion 28 is mounted the valve 25 and coöperating parts. The top of the chamber 4 is removable so that ready access to the parts contained therein is provided.

I provide a vertical rod 29 that is adjustable through the top of the chamber 4 and extends into the chamber. A boss 30 is formed in the top of the chamber on the outer face thereof to slidably receive the rod 29. A circular head 31 is formed on the upper end of the rod 29 so that the operator may press his foot upon the head and force the rod 29 downwardly. The rod 29 is positioned above the float 17 so that when pushed downwardly it will engage the float and serve to loosen the same should it become stuck or slightly deranged. This rod 29 is only to be used in cases when the float will not operate owing to the fact of its sticking. A helical expansion spring 32 is mounted upon the upper portion of the rod 29 and engages the head 31 and boss 30. A transverse pin 33 is carried intermediate the end of said rod and engages the inner face of the top of said chamber, 4. The spring serves to return the rod 29 to normal position.

In operation the tank or reservoir 1 is filled and the valve or cock 15 turned to allow the oil to run through the pipe 3 into the float chamber 4. As the oil fills the main part of the chamber 4 the float 17 will rise and in so doing and through the medium of the bell crank 18 force the frusto-conical valve 25 toward its seat, thus cutting off the supply of oil to the float chamber 4. From the chamber 4 the pipe 5 conducts the oil to the cylinder 6 of an engine and from the pipe 5 the pipe 7 conducts the oil to the vertical and cylindrical float chamber 8. The oil rising in the float chamber 8 forces upwardly the float 9 which is connected with the indicator 11 in such manner that the depth of oil within the cylinder is at all times indicated. The oil may be drained if desired by the drain cock 14. The size of the chamber 4 is governed by the size of the crank case to which the device is to be applied.

What is claimed is:—

1. In a lubricating system for internal combustion engine, a supply tank, a regulator having a float chamber and a valve chamber, said valve chamber being smaller than the float chamber and located at a point adjacent the upper side of and extending laterally from the float chamber, the bottom wall of the float chamber having an outlet opening and the bottom wall of the valve chamber having an inlet opening, a pipe establishing communication between the supply tank and the inlet opening of the valve chamber, a valve within the valve chamber and adapted when in one position to close said inlet opening, a pivot post located within the float chamber at a point adjacent the upper side thereof, a rod pivoted to said post and having a horizontal arm extending into the valve chamber and connected to said valve, said rod also having a downwardly extending vertical arm located within the float chamber, and a float carried by the lower end of the vertical arm.

2. In a lubricating system for an internal combustion engine, a supply tank, a regulator, a float chamber and valve chamber in said regulator, a pipe connected to the supply tank and to the valve chamber, a second pipe connected to the float chamber and to a crank case of an engine, a cylindrical casing, a float in said casing, a needle rod extending upwardly from said float and slidable within the cylindrical casing, a gage carried at the upper end of the rod, a pipe connected to the pipe connecting the crank case to the float chamber said pipe connected centrally between the regulator and crank case, its opposite end connected to the cylindrical casing as for the purpose specified.

In testimony whereof I affix my signature in presence of two witnesses.

LYNDON F. HARTSELL.

Witnesses:
I. B. TUMLEY,
M. J. McFADGEN.